US011465457B2

(12) United States Patent
Easley

(10) Patent No.: US 11,465,457 B2
(45) Date of Patent: Oct. 11, 2022

(54) WHEEL-MOUNTED AIR COMPRESSION APPARATUS

(71) Applicant: Cameron Easley, Indianapolis, IN (US)

(72) Inventor: Cameron Easley, Indianapolis, IN (US)

(*) Notice: Subject to any disclaimer, the term of this patent is extended or adjusted under 35 U.S.C. 154(b) by 595 days.

(21) Appl. No.: 16/546,428

(22) Filed: Aug. 21, 2019

(65) Prior Publication Data
US 2020/0062052 A1 Feb. 27, 2020

Related U.S. Application Data

(60) Provisional application No. 62/721,280, filed on Aug. 22, 2018.

(51) Int. Cl.
B60C 23/10 (2006.01)
F04B 49/02 (2006.01)
F04B 39/12 (2006.01)
F04B 35/04 (2006.01)
B60C 23/12 (2006.01)
B60C 23/00 (2006.01)
F04B 35/01 (2006.01)
F04B 25/00 (2006.01)
F04B 35/06 (2006.01)
B60S 5/04 (2006.01)

(52) U.S. Cl.
CPC ............ *B60C 23/10* (2013.01); *B60C 23/004* (2013.01); *B60C 23/126* (2020.05); *B60C 23/127* (2020.05); *B60C 23/129* (2020.05); *B60C 23/137* (2020.05); *B60S 5/043* (2013.01); *F04B 25/00* (2013.01); *F04B 35/01* (2013.01); *F04B 35/04* (2013.01); *F04B 35/06* (2013.01); *F04B 39/12* (2013.01); *F04B 49/022* (2013.01); *F04B 2205/04* (2013.01); *F05B 2240/941* (2013.01); *F05B 2270/3013* (2013.01)

(58) Field of Classification Search
CPC ... B60C 23/137; B60C 23/129; B60C 23/127; B60C 23/004; B60C 23/126; B60C 23/10; F04B 35/06; F04B 35/04; F04B 35/01; F04B 25/00; F04B 39/12; F04B 49/022; F04B 2205/04; B60S 5/043; F04C 25/00
See application file for complete search history.

(56) References Cited

U.S. PATENT DOCUMENTS 5,505,080 A * 4/1996 McGhee ............... B60C 23/131
340/447

* cited by examiner

Primary Examiner — Peter J Bertheaud
(74) Attorney, Agent, or Firm — Dale J. Ream

(57) ABSTRACT

A wheel-mounted air compression apparatus for maintaining a predetermined inflation pressure of a tire mounted on a wheel of a vehicle and the tire having an inflation port includes a housing defining an air compression chamber and has an air compressor device positioned therein. The apparatus includes a plurality of support legs spaced apart from one another. Each support leg is attached to the housing and extends away therefrom and may include a pair of sleeves that are length-adjustable for mounting to wheels of various sizes. A pressure sensor is situated in the housing and operably connected to the air compressor and to a nozzle for determining a current pressure of air within the tire. A controller or other electronics cause the air compressor to pump air into a tire if the air pressure therein is detected as declining below a predetermined amount.

8 Claims, 8 Drawing Sheets

WHEEL-MOUNTED AIR COMPRESSION APPARATUS

REFERENCE TO RELATED APPLICATIONS

This application claims the benefit of provisional patent application U.S. Ser. No. 62/721,280 filed Aug. 22, 2018 titled Wheel Mounted Air Compression Apparatus which is incorporated in its entirety herein by reference.

BACKGROUND OF THE INVENTION

This invention relates generally to air pressure control devices for inflating a tire of an automobile and, more particularly, to a wheel-mounted air compressor assembly having a plurality of length adjustable support legs for attachment to a wheel of an automobile and for maintaining a predetermined amount or pressure of air inside the tire.

Obviously, nobody wants to get a flat tire while driving. But, when a driver gets a flat tire, he has traditionally had only a few options, including pulling over and replacing the flat tire with a spare tire typically carried in the trunk or underneath the car, continuing to drive on the tire that is losing pressure, or pulling over and summoning help or a ride. Alternatively, a driver may carry a pressurized container of air in the trunk and pump a quantity of pressured air into the tire and then continue to drive on the tire. Unfortunately, this latter solution requires the driver to determine a current tire pressure, add air to the tire, and possibly have to stop repeatedly to repeat this procedure. Finally, the prior art has proposed a wheel-mounted air compressor device; however, such devices are specific to a certain size or model of wheel and may not provide reliable pressurization all the way to an auto-shop.

Therefore, it would be desirable to have a wheel-mounted air compressor assembly that includes a plurality of length adjustable support legs for attachment to a wheel of an automobile and configured for maintaining a predetermined amount or pressure of air inside the tire.

SUMMARY OF THE INVENTION

Accordingly, a wheel-mounted air compression apparatus for maintaining a predetermined inflation pressure of a tire mounted on a wheel of a vehicle and the tire having an inflation port according to the present invention includes a housing defining an air compression chamber and has an air compressor device positioned therein. The apparatus includes a plurality of support legs spaced apart from one another. Each support leg is attached to the housing and extends away therefrom and may include a pair of sleeves that are length-adjustable for mounting to wheels of various sizes. A pressure sensor is situated in the housing and operably connected to the air compressor and to a nozzle for determining a current pressure of air within the tire. A controller or other electronics cause the air compressor to pump air into a tire if the air pressure therein is detected as declining below a predetermined level.

Therefore, a general object of this invention is to provide a wheel-mounted air compressor assembly that includes a plurality of length adjustable support legs for attachment to a wheel of an automobile and configured for maintaining a predetermined amount or pressure of air inside the tire to which it is attached.

A further object of this invention is to provide a wheel-mounted air compressor assembly, as aforesaid, having an air pressure sensor that periodically or continuously detects a current amount of air pressure in a tire to which the sensor is attached.

A still further object of this invention is to provide a wheel-mounted air compressor assembly, as aforesaid, that includes a hose and nozzle that interfaces with a tire for communication of air from the air compressor to tire.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
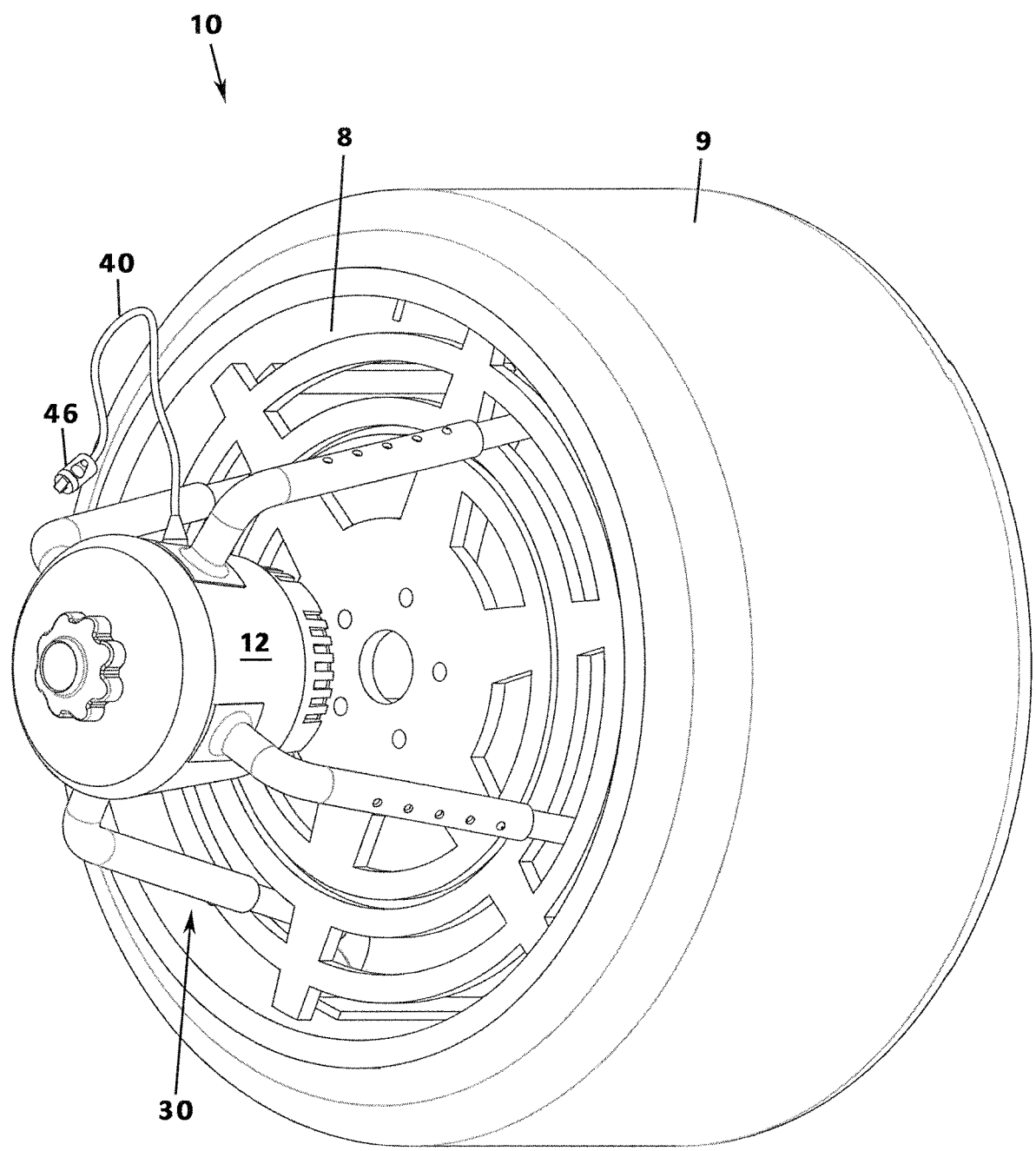
FIG. 1 is a perspective view of a wheel mounted air compressor apparatus according to a preferred embodiment of the present invention, illustrated coupled to a wheel of an automobile and with the hose and nozzle unattached to a tire.
Figure 2:
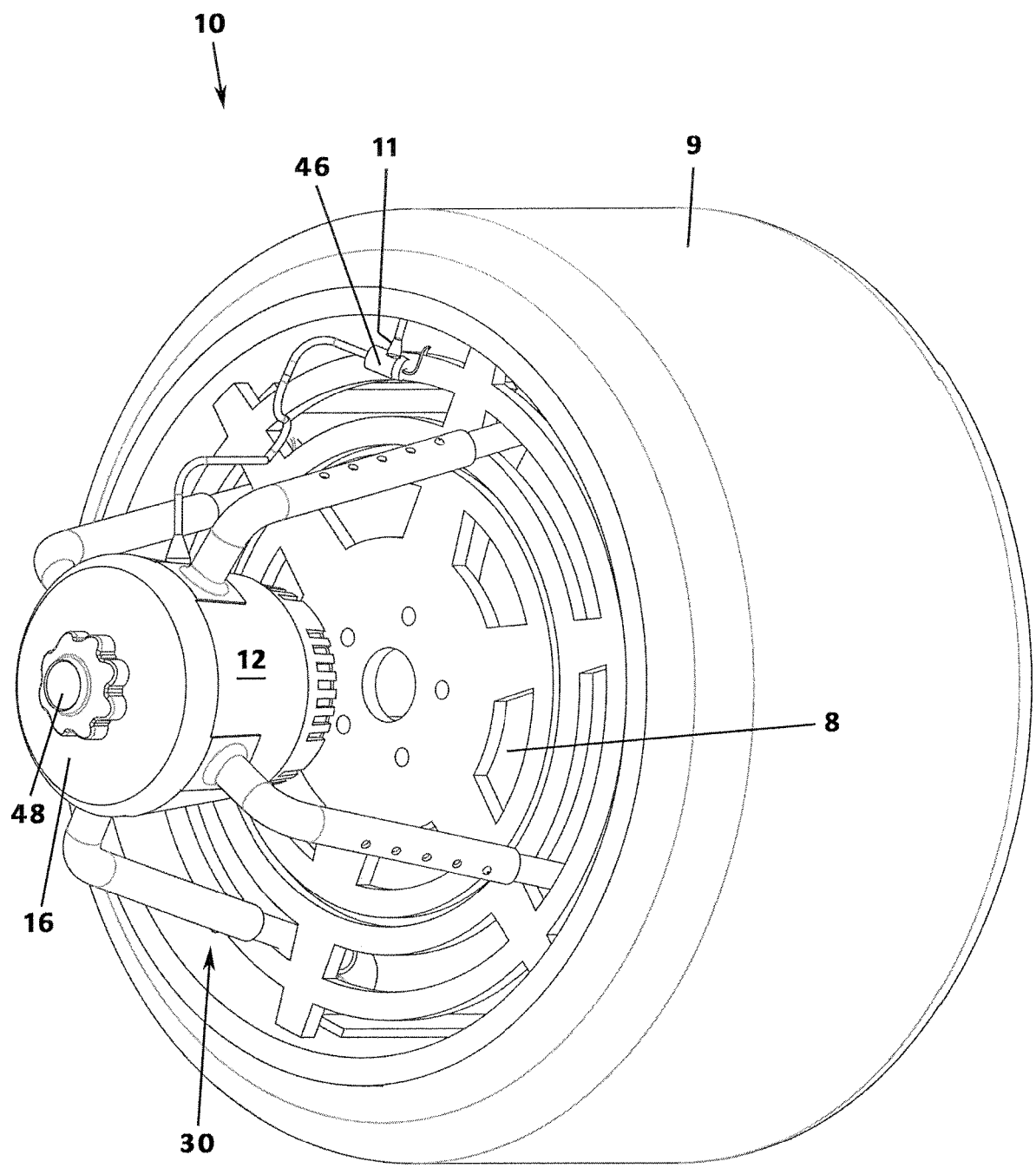
FIG. 2 is another perspective view of the compressor apparatus as in FIG. 1, illustrated with the hose and nozzle in fluid communication with the tire.
Figure 3:
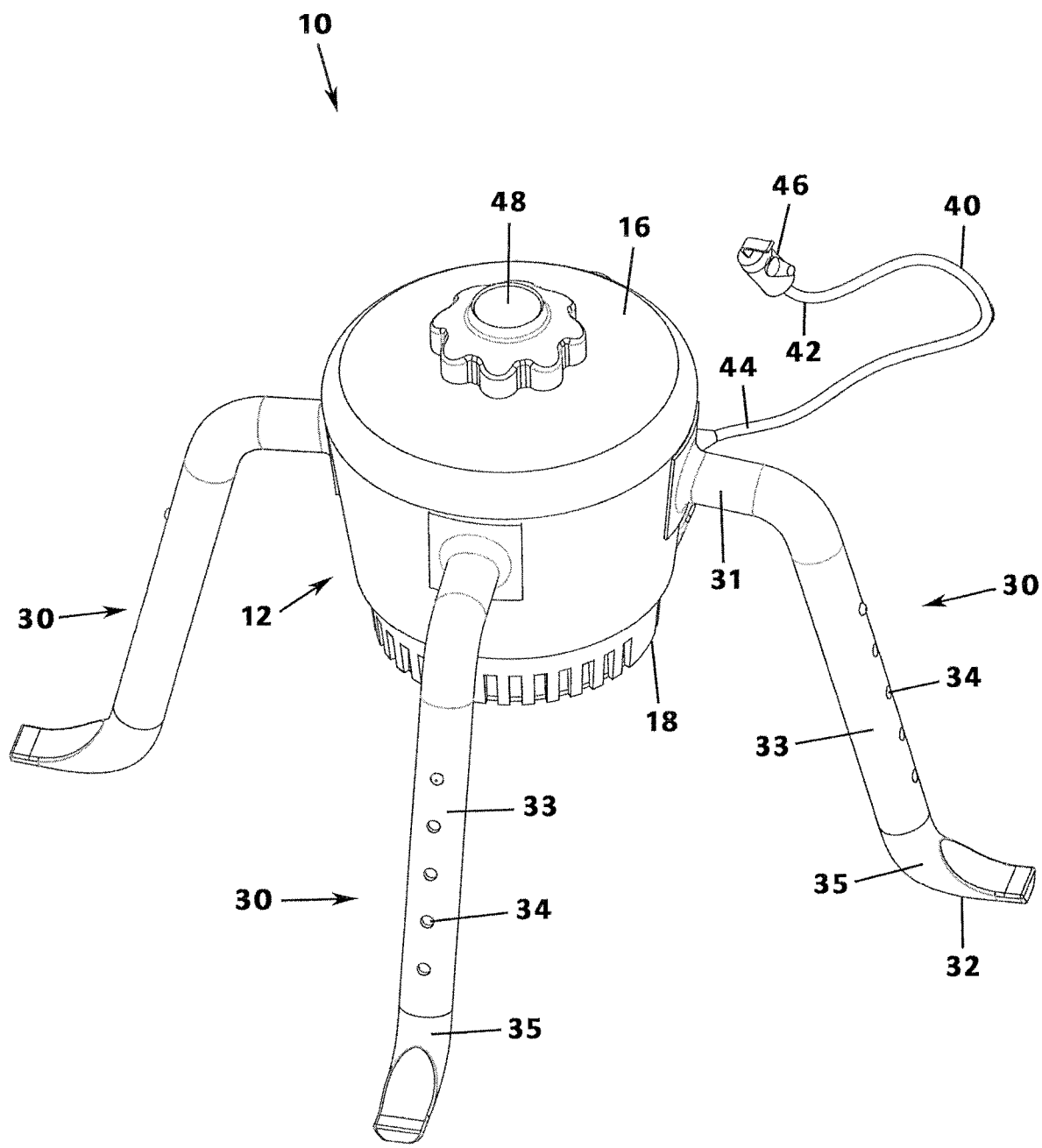
FIG. 3 is a perspective view of the compressor apparatus as in FIG. 1, illustrated removed from the wheel/tire combination and with the support legs in retracted configurations, respectively.
Figure 4:
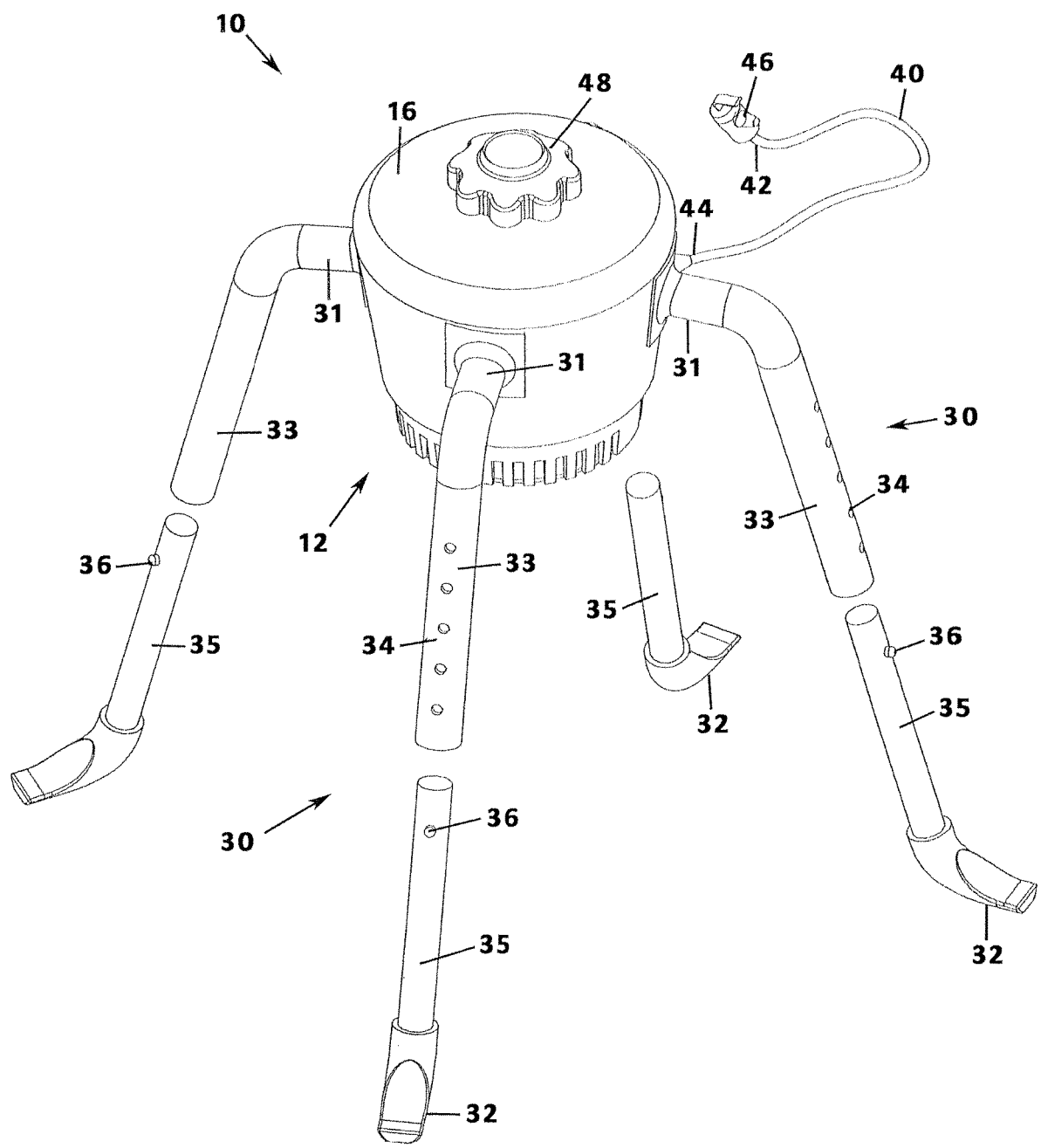
FIG. 4 is an exploded view of the compressor apparatus as in FIG. 3.
Figure 5:
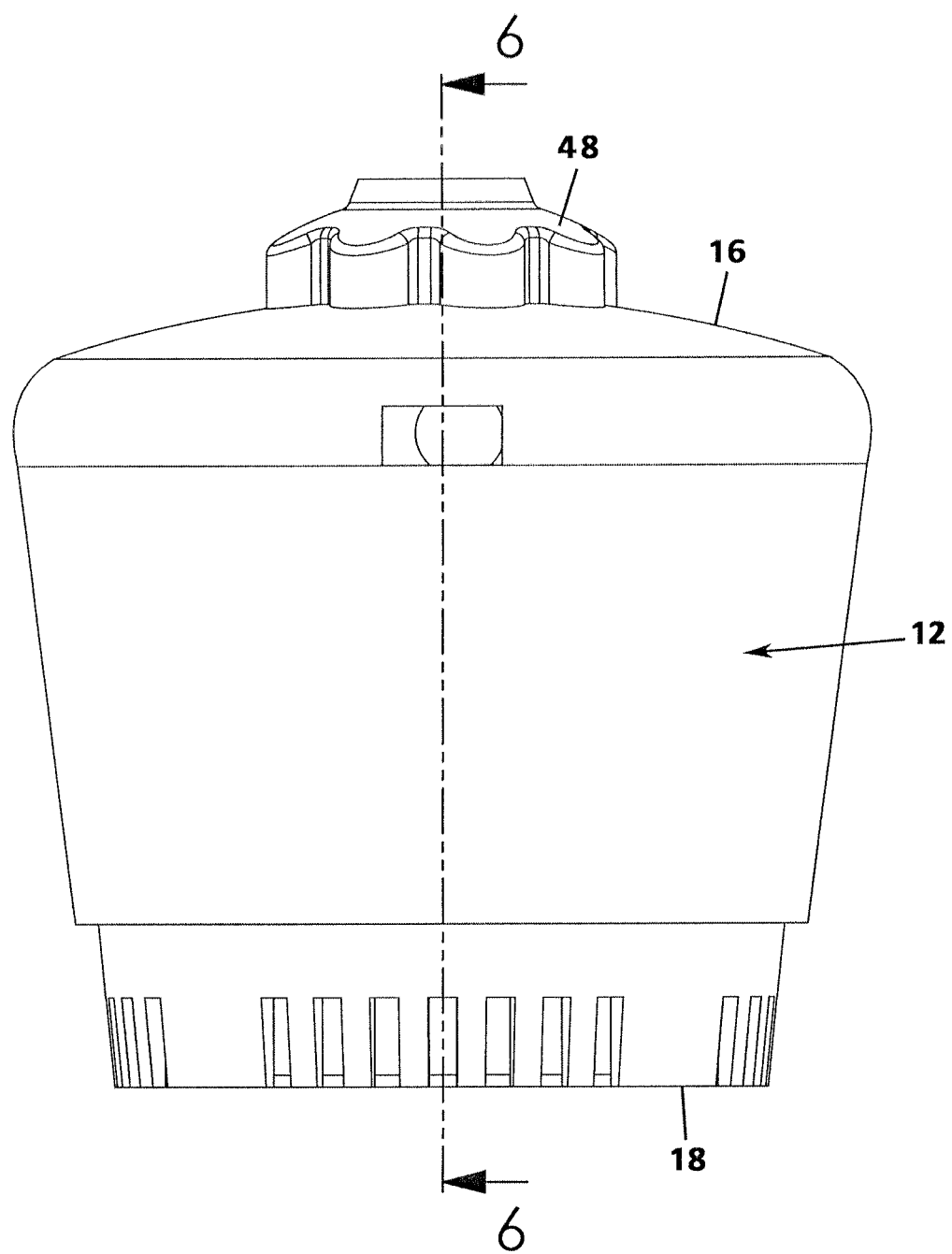
FIG. 5 is a side view of a compressor assembly isolated from the remainder of the compressor apparatus for clarity.
Figure 6:
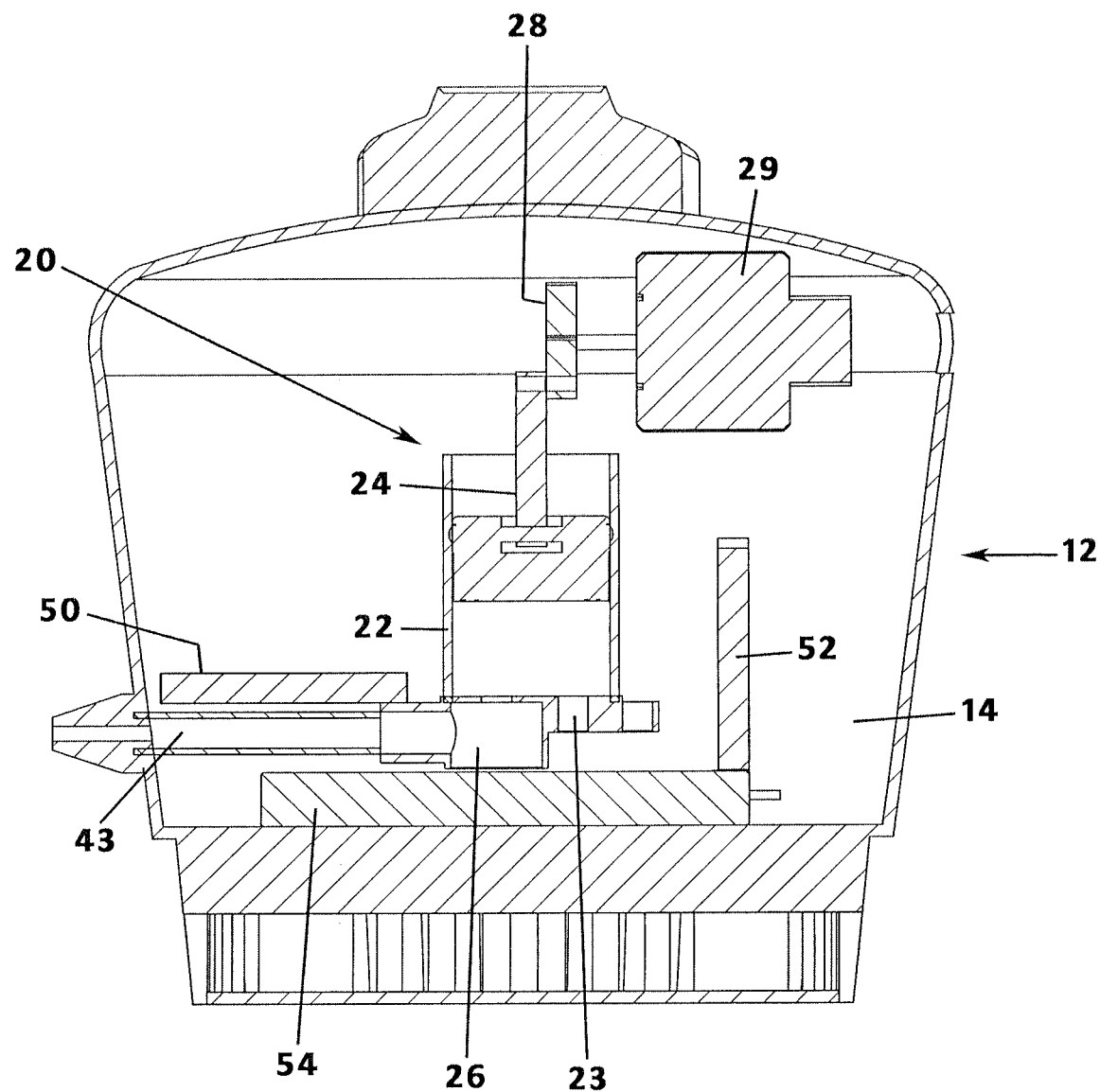
FIG. 6 is a sectional view taken along line 6-6 of FIG. 5.
Figure 7:
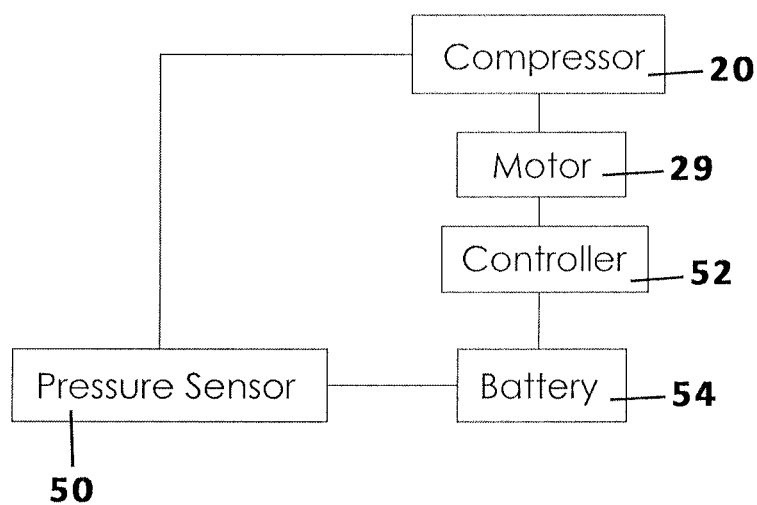
FIG. 7 is a block diagram illustrating the electric and electronic components according to the present invention.

A wheel-mounted air compression apparatus for maintaining a predetermined inflation pressure of a tire mounted on a wheel of a vehicle according to a preferred embodiment of the present invention will be described with reference to FIGS. 1 to 8 of the accompanying drawings. The wheel-mounted air compression apparatus 10 includes a housing 12, an air compression chamber 14, an air compressor assembly 20, a plurality of support legs 30, and a controller 52.

Preferably, the housing 12 has a conical or frustoconical configuration having a singular or continuous side wall bounded by a top wall 16 and a bottom wall 18, respectively. The housing 12 is constructed of a hard and durable material such as metal although hard plastic may also work. The housing 12 defines an interior area that will be referred to as an air compression chamber 14.

An air compressor assembly 20 (which may also be referred to as an air compressor device or just an air compressor) is positioned in the air compression chamber 14. The air compressor assembly 20 includes a traditional arrangement for generating compressed air as will be understood by those of ordinary skill making and using air compressors. More particularly, the air compressor includes a cylinder 22 and a piston 24 situated within the cylinder that is operably movable between an upstroke that pushes air into a storage area 26 and a downstroke that draws ambient air into the cylinder 22 such as via intake valve 23, the piston 24 being reciprocated by a crankshaft 28 rotated by its coupling to a motor 29 when energized by a power source such as a battery 54.

Each one of the plurality of support legs 30 is spaced apart from one another. Each support leg 30 includes a proximal end 31 attached to the housing and a distal end 32 opposite the proximal end 31 and having a configuration complementary to the wheel for attachment to the wheel 8. While each support leg 30 has a body section that is generally cylindrical shape and has a linear configuration, each distal end 32 may have a partially flattened, arc-shaped, and outwardly curved shape configuration capable of a snap-fit or friction fit with a wheel 8. In an embodiment, the distal ends may biased outwardly for a tight fit, such as by being constructed from a spring steel material, by including springs, or the like.

Preferably, each support leg is length adjustable. More particularly, each support leg 30 includes an outer leg sleeve 33 that is hollow and that defines a plurality of holes 34 apart longitudinally from one another. The outer leg sleeve 33 is constructed of a durable material such as a metal material like aluminum or even iron although a durable plastic material would also work. Further, each support leg 30 includes an inner leg sleeve 35 having dimensions that enable the inner leg sleeve 35 to be slidably received within the hollow interior of a respective outer leg sleeve 33. It is understood that respective free ends of the support legs 30 may include rubber feet or other grip material that resists inadvertent slipping or sliding as a patient is using the chair for therapy, testing, or the like.

In an embodiment, each support leg 30 may include a fastener 36 coupled to an inner leg sleeve 35 that is dimensioned and configured to extend through a selected hole 34 of the plurality of holes defined by an associated outer leg sleeve 33. For instance, the fastener 36 may be a spring-loaded pin that is naturally biased to push out through an available hole 34 as the support leg 30 is manually adjusted to a desired length. Alternatively, both the outer leg sleeve 33 and inner leg sleeve 35 may define a plurality of holes and a traditional bolt-like pin may be inserted through corresponding holes when a desired height is adjustably determined. In an embodiment, a rotary knob 48 situated atop the housing 12 may be operably coupled to the plurality of support legs, such as by a linkage (not shown) for incrementally tightening the legs to the rim of a wheel 8.

In another aspect, a flexible hose 40 connects the air compressor assembly 20 to an inflation port 11 of a tire 9. More particularly, the hose 40 includes a first end 42 in fluid communication with the storage area 26, such as via channel 43, for obtaining pressurized air into the hose 40. The hose 40 includes a second end 44 having a nozzle 46 selectively coupled to a corresponding structure at the inflation port 11 of the tire 9 by which pressurized airflows into the tire 9 as explained below.

Next, a pressure sensor 50 is situated in the housing 12 or nozzle 46 for detecting the pressure inside the tire 9. It is understood the air pressure can be determined mechanically with a traditional pressure stick in which a gauge is extended outwardly that has pressure indicia on it. Or, pressure can be detected electronically and forwarded to a processor as will be described later. The pressure sensor 50 may be positioned inside the nozzle itself and then in electrical communication with the air compressor assembly 20 such as with wires or wirelessly. More particularly, a tire pressure sensor may be an electronic component that constantly measures the air pressure inside the tire. In the present invention, the pressure sensor 50 is positioned in the housing 20 and in fluid communication with the tire 9 via the air hose 40 described above.

An embodiment of the invention may include a controller 52 or a processor or other electronic component having a non-volatile memory or electronics operable to energize the air compressor when a predetermined pressure is detected as will be described below. A battery 54 may be positioned in the interior space of the housing 12 for selectively supplying current to the electronic and electric components of the present invention.

As indicated above, the pressure sensor 50 may be directly connected to the air compressor and calibrated to energize the air compressor assembly 20 to operate to push air into the tire 9 via the nozzle 46 until pressure within the tire measures a predetermined pressure, such as 32 pounds per square inch ("psi"). In an industrial embodiment, the pressure sensor 50 may cause the air compressor assembly 20 to fill the tire up to 45 or 50 psi. After an initial filling, the pressure sensor 50 may be configured not to actuate the air compressor assembly 20 again until a predetermined lower pressure is detected, such as 26 psi.

In an embodiment, it is the controller 52 that is programmed to store a psi or is associated with a predetermined psi. More particularly, the pressure sensor 50 is capable of determining a current tire pressure and communicating said pressure to the controller 52. The controller 52, then, is programmed, to actuate the air compressor assembly 20 if a "low" pressure is detected and then runs until the maximum pressure is detected. It is understood that the controller 52 may be programmable, may execute programming steps stored in memory, and is capable of being adjusted for use with different inflation parameters.

Figure 8:
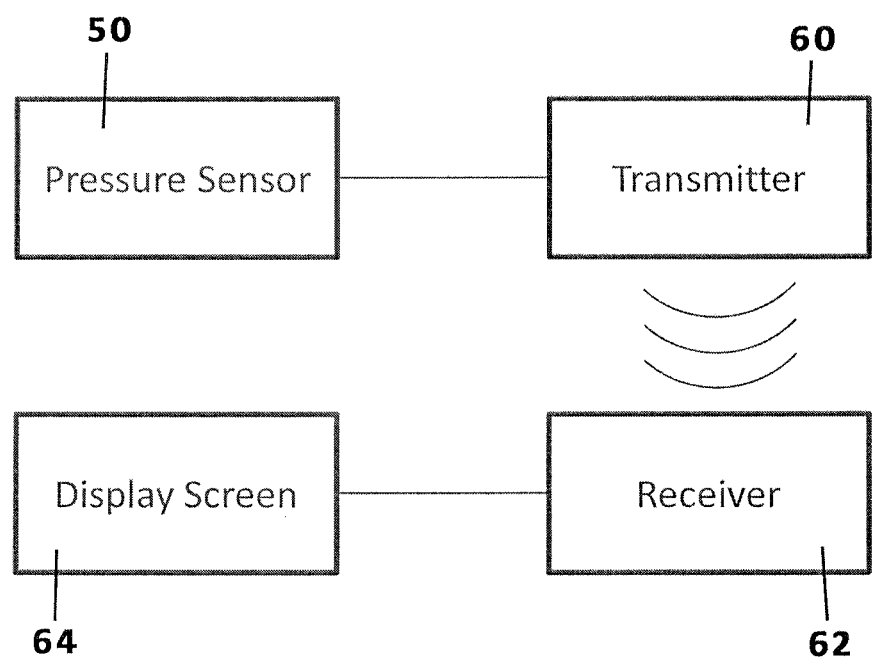
FIG. 8 is a block diagram illustrating another electrical aspect of the present invention.

In another aspect and as illustrated in FIG. 8, the pressure sensor 50 may further include a transmitter 60 and be configured to determine a current tire pressure and then to continuously transmit a signal indicative of the current tire pressure, such as via a low-power radio signal. Correspondingly, the pressure sensor 50 may include at least one receiver 62 and display unit having a display screen 64. The receiver 62 is configured to receive the signal transmitted by the transmitter 60 and is electrically connected to the display screen 64 and is operable to publish the received signal, i.e. the current tire pressure. The display screen 64 may be positioned in the interior of the vehicle so as to keep the driver informed that the wheel mounted compressor apparatus 10 is working properly to maintain the tire pressure.

It is understood that while certain forms of this invention have been illustrated and described, it is not limited thereto except insofar as such limitations are included in the following claims and allowable functional equivalents thereof.

The invention claimed is:

1. A wheel-mounted air compression apparatus for maintaining a predetermined inflation pressure of a tire mounted on a wheel of a vehicle and the tire having an inflation port, said wheel-mounted air compression apparatus, comprising:
   a housing defining an air compression chamber;
   an air compressor device positioned in said air compression chamber;
   a plurality of support legs, each support leg having an elongate configuration that is length adjustable and having a proximal end attached to said housing and a distal end opposite said proximal end;
   wherein said plurality of support legs extend away from said housing and are spaced apart from one another and have a configuration complementary to the wheel for attachment to the wheel;

wherein:
each support leg includes an outer leg sleeve that is hollow and defines a plurality of apart holes spaced apart from one another and includes an inner leg sleeve slidably positioned inside said outer leg sleeve, respectively;
each said inner leg sleeve includes a fastener having a configuration for receipt in corresponding holes of an associated outer leg sleeve, respectively; and
whereby said associated outer leg sleeve and said associated inner leg sleeve and said fastener are manually adjustable to adjust a height of a respective support leg;
a hose having a first end in fluid communication with said air compression chamber and a second end having a nozzle coupled to and in fluid communication with the inflation port of the tire;
a pressure sensor situated in said housing and in data communication with said air compressor device and to said nozzle for determining a current pressure of air within the tire;
a battery positioned in said housing; and
a controller positioned in said housing that is in data communication with said pressure sensor and electrically connected to said battery and to said air compressor device, said controller configured to energize said air compressor device if said pressure sensor detects less than a predetermined air pressure in said tire.

2. The wheel-mounted air compression apparatus as in claim 1, wherein:
each support leg of said plurality of support legs includes a body section having a linear configuration defining a longitudinal axis and said plurality of holes;
each distal end of said plurality of support legs has an arc-shaped configuration extending away from a longitudinal axis defined by a corresponding support leg; and
said each distal end having a shape configuration for mating with the wheel of the vehicle.

3. The wheel-mounted air compression apparatus as in claim 1, wherein said tire pressure sensor includes a transmitter configured to transmit a signal indicative of said current pressure.

4. The wheel-mounted air compression apparatus as in claim 3, further comprising a display unit having a display screen and a receiver configured to receive the transmitted signal indicative of the current pressure and to publish said received signal on said display screen.

5. A wheel-mounted air compression apparatus for maintaining a predetermined inflation pressure of a tire mounted on a wheel of a vehicle and the tire having an inflation port, said wheel-mounted air compression apparatus, comprising:
a housing having a continuous side wall and a top wall that, together, define an air compression chamber;
an air compressor device positioned in said air compression chamber;
a plurality of support legs, each support leg being length adjustable and including a proximal end attached to said housing and a distal end opposite said proximal end and including a body section extending between said proximal end and said distal end;
wherein said plurality of support legs are spaced apart from one another and extend away from said housing, each support leg having a configuration complementary to the wheel for attachment to the wheel;
wherein:
each support leg includes an outer leg sleeve that is hollow and defines a plurality of apart holes spaced apart from one another and includes an inner leg sleeve slidably positioned inside said outer leg sleeve, respectively;
each said inner leg sleeve includes a fastener having a configuration for receipt in corresponding holes of an associated outer leg sleeve, respectively; and
whereby said associated outer leg sleeve and said associated inner leg sleeve and said fastener are manually adjustable to adjust a height of a respective support leg;
a hose having a first end in fluid communication with said air compression chamber and a second end having a nozzle coupled to and in fluid communication with the inflation port of the tire;
a pressure sensor situated in said housing and in data communication with said air compressor device and electrically coupled to said nozzle for determining a current pressure of air within the tire;
a battery positioned in said housing; and
a controller positioned in said housing that is in data communication with said pressure sensor and electrically connected to said battery and to said air compressor device, said controller configured to energize said air compressor device if said pressure sensor detects less than a predetermined air pressure in said tire.

6. The wheel-mounted air compression apparatus as in claim 5, wherein:
each distal end of said plurality of support legs has an arc-shaped configuration extending away from a longitudinal axis defined by a corresponding body section of said support leg; and
said each distal end having a shape configuration for mating with the wheel of the vehicle.

7. The wheel-mounted air compression apparatus as in claim 5, wherein said tire pressure sensor includes a transmitter configured to transmit a signal indicative of said current pressure.

8. The wheel-mounted air compression apparatus as in claim 7, further comprising a display unit having a display screen and a receiver configured to receive the transmitted signal indicative of the current pressure and to publish said received signal on said display screen.

\* \* \* \* \*